US012732497B2

(12) United States Patent
Pandey et al.

(10) Patent No.: US 12,732,497 B2
(45) Date of Patent: Sep. 8, 2026

(54) MEDIA ACCESS CONTROL (MAC) RANDOMIZED BONJOUR SERVERS IDENTIFICATION AND POLICY APPLICATION

(71) Applicant: HEWLETT PACKARD ENTERPRISE DEVELOPMENT LP, Spring, TX (US)

(72) Inventors: Anjanish Pandey, Bangalore (IN); Suresh Vaidya, Bangalore (IN); Vinay Gopi, Bangalore (IN); Arun Prabhakaran Nair, Bangalore (IN); Vikas Bangalore, Bangalore (IN); Thirumala Baladas Kunda, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 200 days.

(21) Appl. No.: 18/616,401

(22) Filed: Mar. 26, 2024

(65) Prior Publication Data

US 2025/0260689 A1 Aug. 14, 2025

(30) Foreign Application Priority Data

Feb. 9, 2024 (IN) ............................. 202441008820

(51) Int. Cl.
*H04L 9/40* (2022.01)
*H04L 9/16* (2006.01)
(Continued)

(52) U.S. Cl.
CPC ...... *H04L 63/0876* (2013.01); *H04L 61/4511* (2022.05); *H04L 63/0421* (2013.01); *H04L 2101/622* (2022.05)

(58) Field of Classification Search
None
See application file for complete search history.

(56) References Cited

U.S. PATENT DOCUMENTS 8,898,249 B1 * 11/2014 Bertz ...................... H04L 61/30 370/254
11,502,988 B2 * 11/2022 Henry ..................... H04L 61/50
(Continued)

FOREIGN PATENT DOCUMENTS

WO WO-2024045092 A1 * 3/2024 .............. H04L 9/00

OTHER PUBLICATIONS

IoT Inspector: Crowdsourcing Labeled Network Traffic from Smart Home Devices at Scale. Huang. ACM. (Year: 2020).*
(Continued)

*Primary Examiner* — Venkat Perungavoor
(74) *Attorney, Agent, or Firm* — Hewlett Packard Enterprise Patent Department

(57) ABSTRACT

A device may obtain a username upon authentication of the device. The username of the device may be associated with the device's MAC address, and used with any other identifier of the device, including a service identifier provided to the device by a service system (e.g., AirGroup), to generate a unique identifier of the device. The unique identifier of the device may maintain the device's properties and various identifications (e.g., MAC address, username, service identification, etc.). The unique identifier of the device may be used to properly identify the device by utilizing the device's properties and various identifications, and used to establish connections with other devices. In this way, a device supporting MAC randomization may be properly identified by verifying the device's properties and other identifications with a list of stored unique identifiers of devices, allowing
(Continued)

300
Receive a Username, MAC address and Service Identifier of a Device 302
Pre-Existing Unique Identifier? 304
YES
NO
Retrieve the Unique Identifier of the Device from a Database 306
Generate the Unique Identifier of the Device 308
Retrieve a Connectivity List of a Plurality of Devices comprising the Device 310
Determine the Device Receives a New MAC Address 312
Update the Unique Identifier of the Device 314
Update the Connectivity List of the Plurality of Devices 316 the device to maintain established connections with other devices without the performance of reauthentication.

18 Claims, 5 Drawing Sheets

(51) Int. Cl.

| | |
|---|---|
| ***H04L 61/4511*** | (2022.01) |
| ***H04W 12/069*** | (2021.01) |
| *H04L 101/622* | (2022.01) |
| *H04W 12/062* | (2021.01) |
| *H04W 12/50* | (2021.01) |

(56) References Cited

U.S. PATENT DOCUMENTS

| | | | | |
|---|---|---|---|---|
| 11,785,463 | B2 * | 10/2023 | Maass | H04W 4/38<br>455/410 |
| 2012/0054841 | A1 * | 3/2012 | Schultz | G06F 21/51<br>726/22 |
| 2017/0230350 | A1 * | 8/2017 | Enrique Salpico | H04L 69/326 |
| 2024/0381096 | A1 * | 11/2024 | Beg | G01S 13/878 |

OTHER PUBLICATIONS

DNSNA: DNS Name Autoconfiguration for Internet of Things Devices. Lee. IEEE. (Year: 2016).*

* cited by examiner

Computing Component 400

Hardware Processors 402

Machine-Readable Storage Media 404

Retrieve a Media Access Control (MAC) Address, Username, and Service Identifier of a Device 406

Generate a Unique Identifier of the Device based on the Username, the MAC Address, and the Service Identifier 408

Retrieve a Connectivity List of a Plurality of Devices comprising the Unique Identifier of the Device 410

Determine the Device Receives a New MAC Address according to the Username and the Service Identifier of the Device 412

Update the MAC Address with the New MAC Address of the Device 414

Update the Unique Identifier of the Device according to the New MAC Address 416

FIG. 4

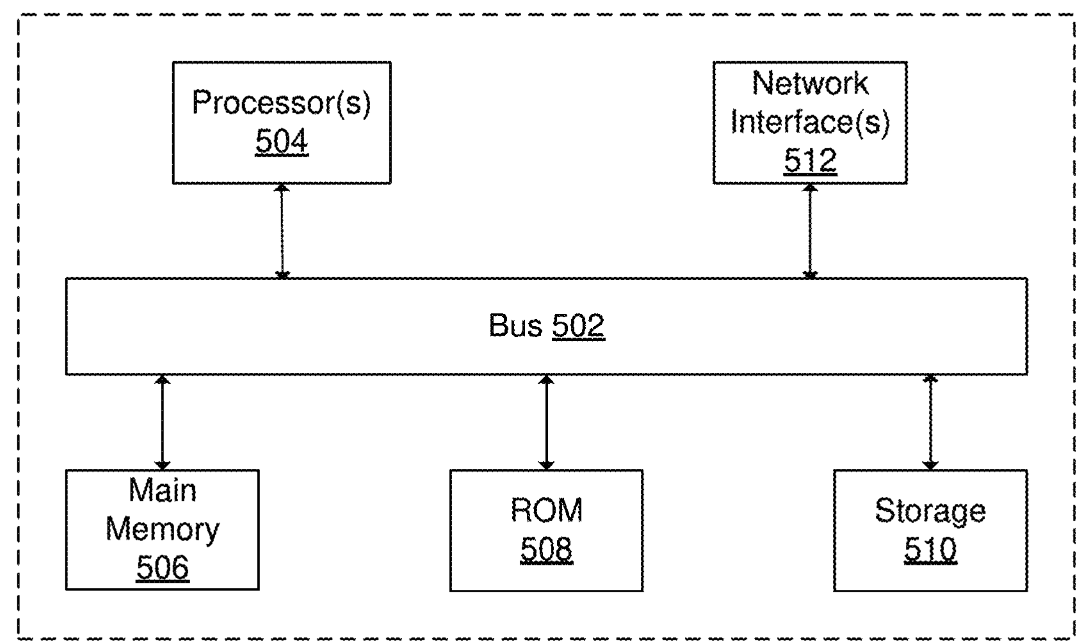
FIG. 5

MEDIA ACCESS CONTROL (MAC) RANDOMIZED BONJOUR SERVERS IDENTIFICATION AND POLICY APPLICATION

BACKGROUND

Domain Name System (DNS) is a system for naming computers, services, and other resources in the Internet or other IP networks through domain names. A DNS protocol is a program that is used by other programs to map domain names to IP addresses and is part of other protocols that enable communication over the Internet. Multicast Domain Name System (mDNS) is a small-scale implementation of the DNS protocol that can be used to resolve hostnames to IP addresses without the need of a dedicated DNS server. A mDNS protocol involves two types of devices, one which advertises a service and one which queries for a service. Chromecast, Amazon firestick, Apple TV, Roku, and Android TV with screen-sharing capabilities are examples of devices that advertise a service. Android mobiles, iPhones, iPad, and MacBooks are examples of devices that query a service.

A Media Access Control (MAC) address is a unique identifier assigned to a device for use as a network address in communications within a network. In networking, devices are typically identified using their MAC address or Internet Protocol (IP) address. Data may be sent between devices within a network by using the MAC addresses of the devices to identify the route of the data transfer. Networking protocols and applications also depend on the MAC address or IP address of a device for identification.

When a device connects to a network, a device may be anonymous to the other devices in the network by undergoing MAC randomization. MAC randomization is a process of providing a random MAC address to a device connecting to a network to hide the device's original MAC address. The random MAC address assigned to the device by the MAC randomization will be sent to the other devices in the network and connections with the other devices will be established using the random MAC address. The MAC randomization process may be implemented on a device periodically, to assign the device with a new, random MAC address in order to ensure the device's anonymity.

Bonjour services between particular devices, such as Apple devices, may be used with service applications that may allow the Bonjour services to be managed in an efficient manner. A Bonjour service is a zero-configuration networking implementation that allows service discovery, address assignment and connectivity between different types of devices in a network. Devices may be segregated into two categories: public and private. Public devices are the devices which are owned and/or managed by an administrator(s) of an organization(s), where visibility is open to all users of the organization(s). Private devices are the devices which are owned and/or managed by a private owner(s), where visibility is restricted to devices of the private owner by default. Private owner(s) may be able to extend visibility of private devices to other client devices using the identification of the client devices, i.e., by adding identifiers of the client devices as friend/colleague usernames to a list of shared devices. A service application to be used with Bonjour services may allow administrators/private users within a DNS protocol to set policy-based discovery, and enable location-based discovery of client devices, such that devices can easily find each other, communicate with each other, and operate with a large amount of interconnectivity.

A service application may identify devices using the device's MAC address for Bonjour services. This makes a service application an ineffective feature of Bonjour services for devices supporting MAC randomization given that such devices will be assigned a random MAC address that will periodically change. The changing of a device's MAC address would defeat a private owner's ability to extend visibility of private devices to the particular device since the particular device's identification in a friend/colleague usernames list will not match. Changing of a device's MAC address would further cause existing communication connections between the particular device and other devices to be reestablished upon reauthentication of the device's identification.

BRIEF DESCRIPTION OF THE DRAWINGS

The present disclosure, in accordance with one or more various examples, is described in detail with reference to the following figures. The figures are provided for purposes of illustration only and merely depict typical or exemplary examples.

FIG. 4 is an illustration of an example computing component that includes one or more hardware processors and machine-readable storage media storing a set of machine-readable/machine-executable instructions that, when executed, cause the one or more hardware processors to perform an illustrative method for identifying and verifying a client device supporting MAC randomization, in accordance with an example described in the present disclosure.

FIG. 5 illustrates a block diagram of an example computer system in which various examples of the present disclosure may be implemented.

Figure 1:
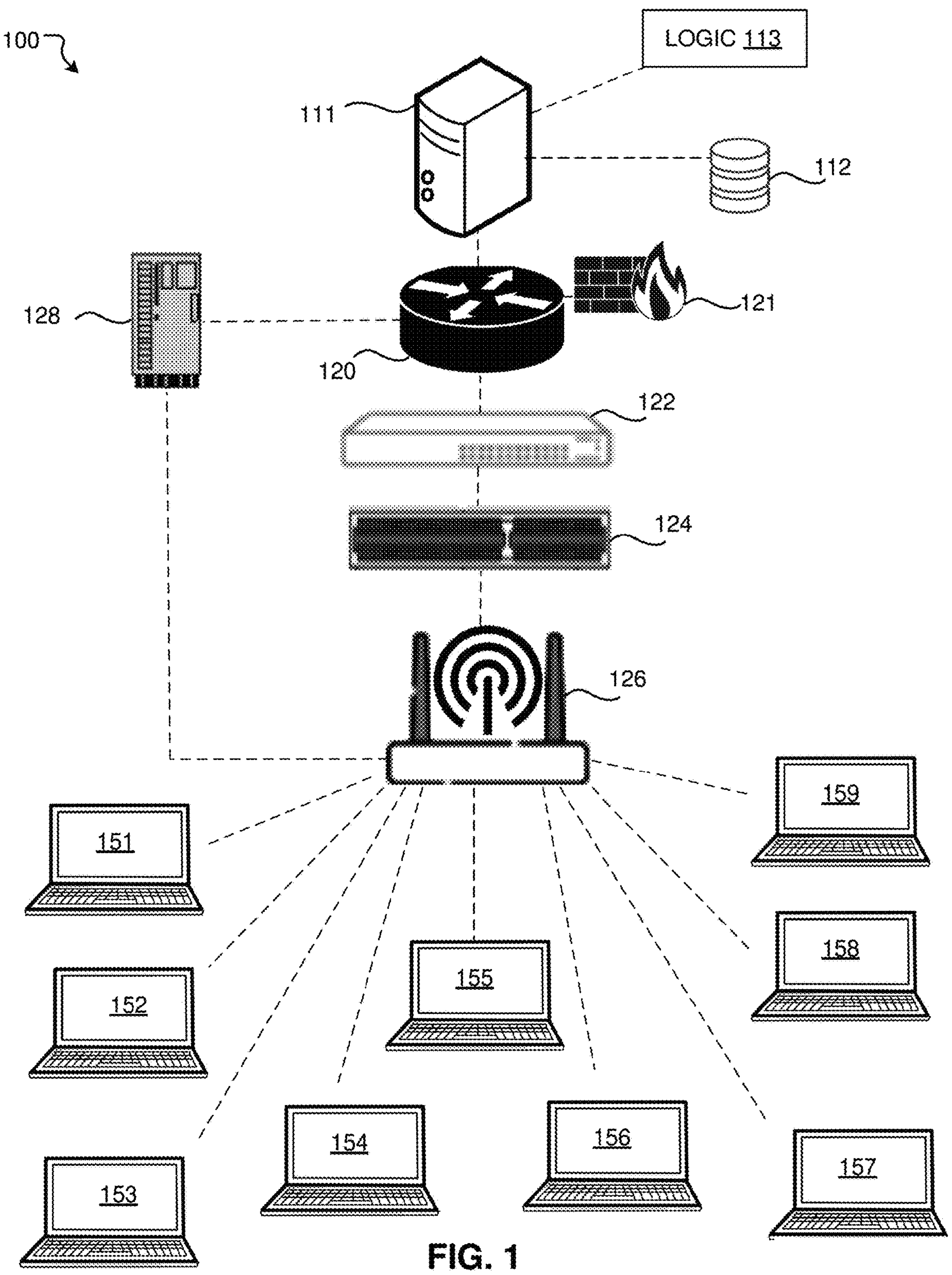
FIG. 1 is an illustration of an example computing system of a network, according to an example described in the present disclosure.

The figures are not exhaustive and do not limit the present disclosure to the precise form disclosed.

DETAILED DESCRIPTION

As alluded to above, changing the MAC address of a device, e.g., per MAC randomization, defeats a private owner's ability to extend visibility of private devices to the device since the device's MAC address identification will not match a list of device identifications considered as a friend/colleague identification to establish connectivity. Using properties and various identifiers of the device, an additional identifier of the device may be generated and used to ensure the device may be properly identified even when Media Access Control (MAC) randomization is performed. Accordingly, examples of the disclosed technology are directed to automatically identify and verify devices supporting MAC randomization to support Bonjour services by allowing the visibility and connectivity of such devices to remain effective without requiring human intervention or reauthentication. In this way, and in contrast to the aforementioned technologies, examples of the present disclosure enable an alternative identification mechanism to avoid conventional device identification and connectivity problems in the MAC randomization context.

Examples of the disclosure may provide systems and methods configured to identify and verify a device supporting MAC randomization. Using a device's MAC address, the device may obtain a particular username upon authentication of the device. The username of the device may be associated with the device's MAC address, and used with any other identifier of the device, including a service identifier provided to the device by a service system (e.g., AirGroup), to generate a unique identifier of the device. The unique identifier of the device may maintain the device's properties and various identifications (e.g., MAC address, username, service identification, etc.). The unique identifier of the device may be used to properly identify the device by utilizing the device's properties and various identifications, and used to establish connections with other devices. In this way, a device supporting MAC randomization may be properly identified by verifying the device's properties and other identifications (e.g., username, service identification, etc.) with a list of stored unique identifiers of devices. Performing a verification may determine if the device has a pre-existing unique identification to be updated with any new MAC address of the device. Performing a verification may also allow any device supporting MAC randomization to maintain preexisting connections with other devices without the performance of reauthentication. In this way, a device supporting MAC randomization may continue to utilize Bonjour services while maintaining its privacy.

For example, the examples disclosed herein can use a network device, such as an access point (AP), to identify and verify a client device supporting MAC randomization. The network device may receive a connection with the client device. Upon establishing a connection with the client device, the network device may obtain a pre-shared key and MAC address of the client device. The network device may send the pre-shared key and the MAC address to an authentication server. The authentication server may use the pre-shared key and the MAC address of the client device to validate the client device and generate a username for the client device. The network device may receive the username of the client device upon validation of the client device by the authentication server. The network device may associate the username and the MAC address of the client device together, and store the username and the MAC address of the client device in a database as identification information of the client device.

The network device may obtain a service identifier of the client device. The service identifier may be obtained from an advertisement packet sent to the network device from a Multicast Domain Name System (mDNS). The network device may use the username, MAC address and service identifier of the client device to generate a unique identifier of the client device. The unique identifier of the client device may be used to maintain the properties and various identifications of the client device. The unique identifier of the client device may be used to properly identify the client device by utilizing the client device's properties and various identifications. The unique identifier of the client device may be used to establish communication connections with other devices in the network. The network device may publish the unique identifier of the client device to the mDNS server and to one or more services that may use the unique identifier to identify the client device. The network device may retrieve a connectivity list that includes a list of all communication connections between a plurality of devices in the network, including the client device. The connectivity list may include the identification information, including the unique identifier, of all of the devices in the network, including the client device.

If the client device supports MAC randomization, the client device may perform MAC randomization to receive a new MAC address to maintain anonymity. The network device may periodically receive identification information of the client device. When the client device obtains a new MAC address, the network device may receive identification information including the new MAC address. The network device may not be able to properly identify the client device because of the new MAC address of the client device. The network device may obtain the username and the service identifier of the client device that was included in the identification information received from the client device. The network device may use the username and the service identifier to determine that the client device obtained a new MAC address from MAC randomization. The network device may determine the client device obtained a new MAC address by comparing such identification information of the username and the service identifier to the connectivity list, and determine that the username and the service identifier of the client device are identical to the information listed for the client device.

Upon identifying that client device, using the username and the service identifier of the client device, and determining that the client device obtained a new MAC address from MAC randomization, the network device may replace the stored MAC address of the client device with the new MAC address. The network device may update the unique identifier of the client device with the new MAC address. The network device may update the connectivity list with the updated unique identifier of the client device, to properly manage and record the identification information of the client device. By updating the connectivity list upon verification of the identification of the client device after performing MAC randomization, existing communication connections between the client device and other devices in the network may be maintained. In this way, the network device may monitor and manage the communication connections between a plurality of devices in the network, including the client device, without having to reauthenticate the client device and reestablish communication connections for the client device.

Although examples of the disclosed technology are provided in the MAC context, the examples are not limited to the MAC context and may be used to identify devices supporting anonymity, such as devices implementing a High-Level Data Link Control protocol (HDLC) or Point-to-Point Protocol (PPP), which do not use the MAC address of the respective device. The devices supporting anonymity may further include devices using token ring based access for communication through a Carrier-Sense Multiple Access/Collision Detection (CSMA/CD) protocol. Many variations are possible.

FIG. 1 is an example illustration of computing system 100 including one or more computing components that may encompass any of a server 111, a router 120, a switch 122, a network controller 124, an access point (AP) 126, and a DHCP server 128. In some examples, the router 120 may be associated with a firewall 121. The server 111 may further include or be associated with a database or cache 112 (hereinafter "database") which stores attributes of particular client devices and access control lists or policies associated with particular client devices, such as client devices 151-159, which connect to a network via the access point 126. In some examples, any or all of the client devices 151-159 may include plug and play devices. Although only nine client devices are illustrated in FIG. 1, any number of client devices may be connected via the access point 126. The database 112 may be integrated or embedded within the server 111 or spatially separated from the server 111. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the server 111, rather than at other computing components such as the router 120, so that the server 111 may centrally update the access control lists or policies and propagate any updates to other computing components in the network.

Each of the computing components may include one or more hardware processors and logic that implements instructions to carry out the functions of the computing components. The server 111 may include or be associated with one or more hardware processors and logic 113 that implements instructions or protocols to carry out the functions of the server 111. The logic 113 may execute instructions to retrieve identification information of a client device. The logic 113 may execute instructions to generate a unique identifier of the client device using identification information of the client device. The logic 113 may execute instructions to retrieve a connectivity list including communication links of the client device. The logic 113 may execute instructions to determine the client device supports MAC randomization by receiving a new MAC address. The logic 113 may execute instructions to update the unique identifier of the client device by verifying the identification information of the client device. The logic 113 may execute instructions to update the connectivity list to maintain the communication links of the client device.

Figure 2:
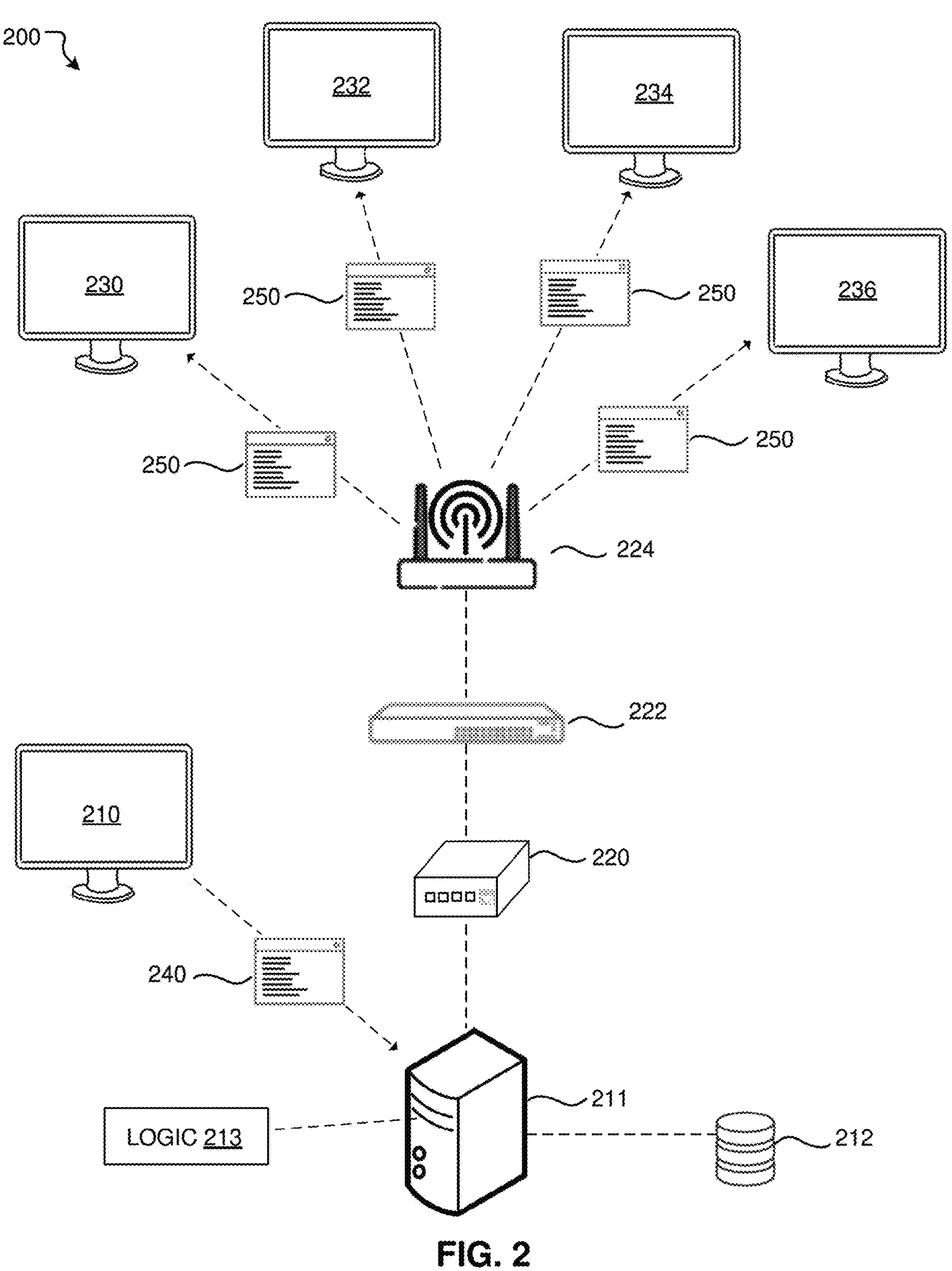
FIG. 2 is an illustration of an example computing system of a network for maintaining communication connections between client devices supporting MAC randomization, in accordance with an example described in the present disclosure.

FIG. 2 is an illustration of an example network 200 over which identification and verification of a client device supporting Media Access Control (MAC) randomization is implemented in accordance with various examples of the present disclosure. In some examples, the network 200 can comprise or include one or more computing components that may encompass any of the server 211, a network device 220, a network controller 222, an access point 224, and client devices 210, 230, 232, 234, and 236. FIG. 2 elaborates on specific components of FIG. 1 while elucidating an exchange of information among the components. The client devices 210, 230, 232, 234, and 236 can be any of computing devices, such as computers, mobile phones, tablet devices, etc. The network device 220 may be implemented as the router 120 or switch 122 of FIG. 1. The network device 220 can be a router or a switch that is configured to connect various computing components in a network, such as the client device 210, the client device 230, the client device 232, the client device 234, the client device 236, the network controller 222, the access point (AP) 224, and the server 211. The server 211 may further include or be associated with the database or cache 212 (hereinafter "database") which stores attributes of particular client devices, servers, and access control lists or policies associated with the client devices 210, 230, 232, 234, and 236, which connect to a network via the access point. In some examples, the client devices 210, 230, 232, 234, and 236 can access the internet, wirelessly, through Wi-Fi (e.g., IEEE 802.11), Bluetooth (e.g., IEEE 802,15,1), or cellular connection (e.g., long-term evolution, $5^{th}$ generation cellular networks, etc.) to wirelessly access the server 211 through the network device 220. The server 211 can implement software and/or hardware, such as web servers, application server, communications server, database server, etc. The server 211 can access the internet through Wi-Fi, Bluetooth, phone line, or LAN/WLAN network interface. In other examples, the network device 220 can be an enterprise intranet (e.g., a private network) and the client devices 210, 230, 232, 234, and 236 can access the enterprise intranet, wirelessly, through the network device 220 to access data files or other enterprise data. In some cases, the network device 220 can be a network link (e.g., Wi-Fi, Ethernet port, router, switch, etc.) that allows a plurality of computing components to communicate with each other. The network controller 222 and the access point 224 can be configured to allow computing components in a network such as the client device 210, the client device 230, the client device 232, the client device 234, the client device 236, and the server 211 to connect through the network device 220. In this example, the network device 220 can establish a client-client communication connection between the client device 210 and each of the client devices 230, 232, 234, and 236.

In some examples, a client device 210 may establish a communication connection with the network device 220, the access point 224, and each of the client devices 230, 232, 234, and 236. The client device 210 may send a transmission packet, such as packet 240, to the network device 220. The packet 240 may include a pre-shared key and MAC address of the client device 210. The network device 220 may use server 211 to implement one or more operations. The network device 220 may send the pre-shard key and the MAC address of the client device 210 to an authentication server. The authentication server may use the pre-shared key and the MAC address of the client device 210 to validate the client device 210. Upon validating the client device 210, the authentication server may generate a username for the client device 210. The network device 220 may receive the username of the client device 210 from the authentication server. The server 211 may associate the username and the MAC address of the client device 210 together as identification information of the client device 210. The server 211 may store the identification information of the client device 210 in a database, such as database 212.

The network device 220 may obtain a service identifier of the client device 210. The service identifier may be obtained from an advertisement packet sent to the network device 220 from a Multicast Domain Name System (mDNS). The network device 220 may obtain the service identifier of the client device 210 from the packet 240 sent from the client device 210. The server 211 may use the username, MAC address and service identifier of the client device 210 to generate a unique identifier of the client device 210. The unique identifier of the client device 210 may be used to maintain the properties and various identifications of the client device 210. The unique identifier of the client device 210 may be used to properly identify the client device 210 by utilizing the properties and various identifications of the client device 210. The unique identifier of the client device 210 may be used to establish communication connections with other devices in the network 200, such as client devices 230, 232, 234, and 236. The network device 220 may use the server 211 to publish the unique identifier of the client device 210 to the mDNS server and to one or more services that may use the unique identifier to identify the client device 210. The server 211 may store the unique identifier of the client device 210 in the database 212. The network device 220 may retrieve a connectivity list that includes a list of all communication connections between a plurality of devices in the network 200, including the communication connections between the client device 210 and each of the other client devices 230, 232, 234, and 236. The connectivity list may include the identification information, including the unique identifier, of all of the devices in the network 200, including the client devices 210, 230, 232, 234, and 236.

If the client device 210 supports MAC randomization, the client device 210 may perform MAC randomization to receive a new MAC address to maintain anonymity. The network device 220 may periodically receive a transmission packet 240 including identification information of the client device 210. When the client device 210 obtains a new MAC address, the network device 220 may receive a transmission packet 240 including identification information with the new MAC address. The server 211 may not be able to properly identify the client device 210 because of the new MAC address of the client device 210. The server 211 may obtain the username and the service identifier of the client device 210 that was included in the identification information received from the client device 210 in the transmission packet 240. The server 211 may use the username and the service identifier to determine that the client device 210 obtained a new MAC address from MAC randomization. The server 211 may determine the client device 210 obtained a new MAC address by comparing such identification information of the username and the service identifier to the connectivity list, and determine that the username and the service identifier of the client device 210 are identical to the information listed for the client device 210. The server 211 may determine the client device 210 obtained a new MAC address by comparing such identification information of the username and the service identifier to the identification information stored in the database 212, and determine that the username and the service identifier of the client device 210 are identical to the identification information stored in the database 212 for the client device 210.

Upon identifying that client device 210, using the username and the service identifier of the client device 210, and determining that the client device 210 obtained a new MAC address from MAC randomization, the server 211 may replace the stored MAC address of the client device 210 with the new MAC address. The server 211 may update the unique identifier of the client device 210 based on the new MAC address. The server 211 may update the connectivity list with the updated unique identifier of the client device 210, to properly manage and record the identification information of the client device 210. By updating the connectivity list upon verification of the identification of the client device 210 after the performance of MAC randomization, existing communication connections between the client device 210 and other devices in the network 200, including client devices 230, 232, 234, and 236, may be maintained. The network device 220 may send transmission packets, such as packets 250, to the other client devices 230, 232, 234, and 236. The transmission packets 250 may include updated identification information of the client device 210, including the updated unique identifier of the client device 210. The other client devices 230, 232, 234, and 236 may extract the updated identification information of the client device 210 from the transmission packet 250, and use the updated identification information to update their identification records of the client device 210. In this way, the network device 220 may monitor and manage the communication connections between a plurality of devices in the network 200, including the client devices 210, 230, 232, 234, and 236, without having to reauthenticate the client device 210 and reestablish communication connections between the client device 210 and other devices in the network 200, such as client devices 230, 232, 234, and 236.

Although examples of the disclosed technology are provided in the MAC context, the examples are not limited to the MAC context and may be used to identify devices supporting anonymity, such as devices implementing a High-Level Data Link Control protocol (HDLC) or Point-to-Point Protocol (PPP), which do not use the MAC address of the respective device. The devices supporting anonymity may further include devices using token ring based access for communication through a Carrier-Sense Multiple Access/Collision Detection (CSMA/CD) protocol. Many variations are possible.

Figure 3:
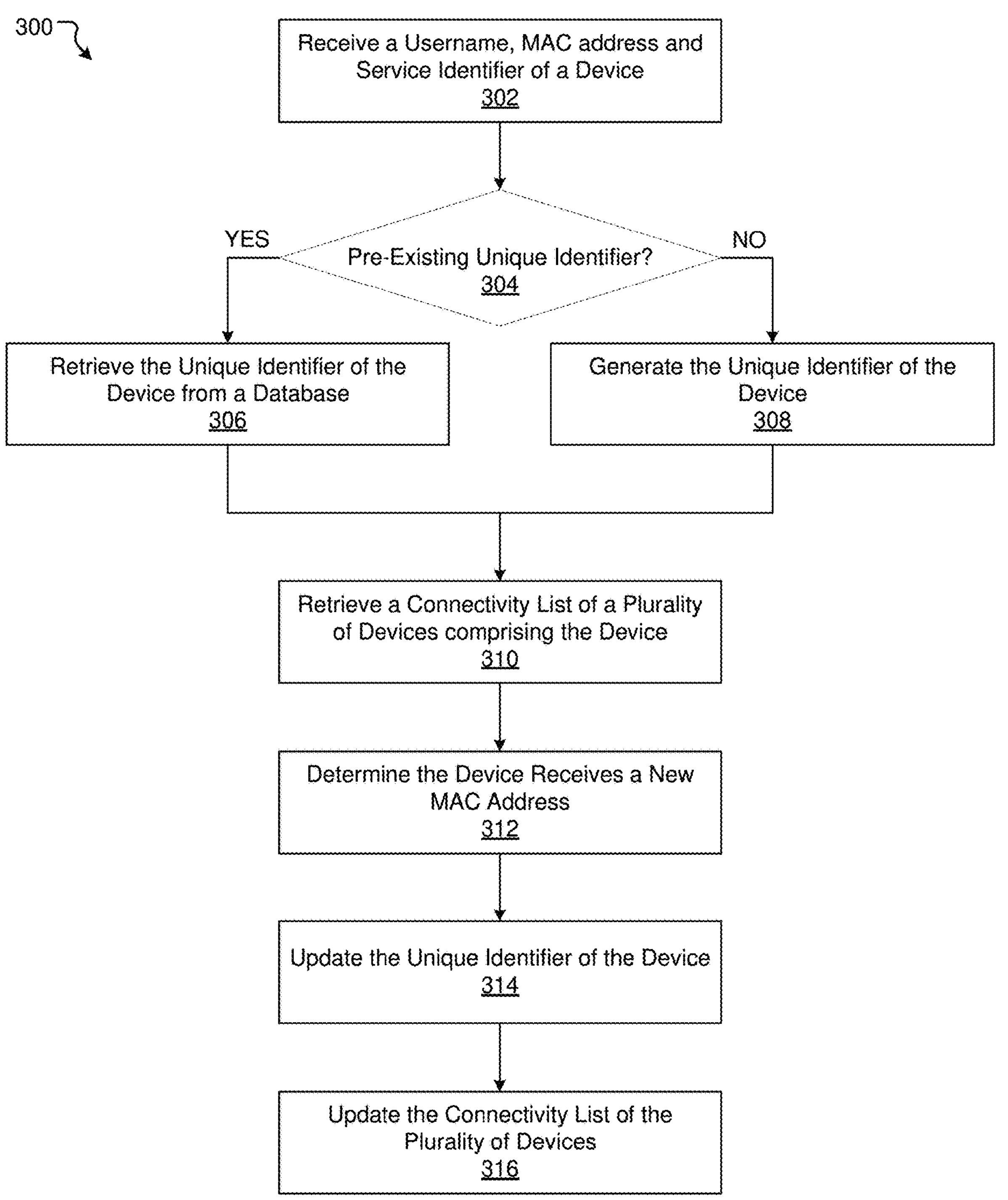
FIG. 3 is an illustration of an example process of identifying and verifying a client device supporting MAC randomization in a network, in accordance with an example described in the present disclosure.

FIG. 3 is an illustration of an example process 300 of identifying and verifying a client device supporting MAC randomization in accordance with various examples of the present disclosure. It should be appreciated that there can be additional, fewer, or alternative steps performed in similar or alternative orders, or in parallel, within the scope of the various examples discussed herein unless otherwise stated.

At block 302, a network device, such as an access point (AP), may retrieve a Media Access Control (MAC) address, a username, and a service identifier of a client device in a network. The network device may receive a connection with the client device. Upon establishing a connection with the client device, the client device may send identification information to the network device. The network device may obtain a pre-shared key and MAC address of the client device from the identification information. The network device may send the pre-shared key and the MAC address to an authentication server. The authentication server may use the pre-shared key and the MAC address of the client device to validate the client device and generate a username for the client device. The network device may receive the username of the client device upon validation of the client device by the authentication server. The network device may associate the username and the MAC address of the client device together, and store the username and the MAC address of the client device in a database as identification information of the client device.

The network device may obtain a service identifier of the client device. The service identifier may be obtained from an advertisement packet sent to the network device from a Multicast Domain Name System (mDNS). The network device may obtain the service identifier of the client device from the identification information sent from the client device. The network device may store the service identifier in a database with other identification information of the client device, such as the username and the MAC address. The network device may obtain the MAC address, the username and the service identifier from the identification information stored in the database. The network device may obtain the MAC address, the username and the service identifier from the identification information sent from the client device. Many variations are possible.

At block 304, the network device may determine if the client device has a pre-existing unique identifier. The unique identifier of the client device may be used to maintain the properties and various identifications, such as the username, MAC address and service identifier, of the client device. The unique identifier of the client device may be used to properly identify the client device by utilizing the client device's properties and various identifications. The unique identifier of the client device may be used to establish communication connections with other devices in the network (e.g., any of the client devices illustrated in FIG. 1 or FIG. 2).

The network device may use the username, the MAC address and the service identifier of the client device to determine if the client device has a pre-existing unique identifier stored in the database. In response to determining the client device has a pre-existing unique identifier, based on the username, the MAC address and the service identifier of the client device, proceed to block 306. In response to determining the client device does not have a pre-existing unique identifier, based on the username, the MAC address and the service identifier of the client device, proceed to block 308.

At block 306, the network device may retrieve the unique identifier of the client device. The unique identifier of the client device may be stored in the database with other identification information of the client device. The network device may find the unique identifier of the client device based on the username, MAC address and service identifier of the client device. The network device may retrieve the unique identifier of the client device from the database. After the network device retrieves the unique identifier of the client device, proceed to block 310.

At block 308, the network device may generate a unique identifier of the client device based on the username, the MAC address and the service identifier. The network device may use the username, MAC address and service identifier of the client device to generate a unique identifier of the client device. The unique identifier of the client device may be used to maintain the properties and various identifications of the client device, including the username, the MAC address and the service identifier. The unique identifier of the client device may be used to properly identify the client device by utilizing the client device's properties and various identifications, such as the username, the MAC address and the service identifier. The unique identifier of the client device may be used to establish communication connections with other devices in the network (e.g., any of the client devices illustrated in FIG. 1 or FIG. 2). After the network device generates the unique identifier of the client device, proceed to block 310.

At block 310, the network device may retrieve a connectivity list of a plurality of devices in the network. The network device may retrieve a connectivity list that includes a list of all communication connections between a plurality of devices in the network, including the client device. The connectivity list may include the identification information, including the unique identifier, of all of the devices in the network, including the client device. Using the connectivity list, the network device may send proper identification information of the client device to other devices the client device have a communication connection with. In this way, the other devices may identify and verify the client device to establish and maintain communication connections with the client device. Using the connectivity list, the network device may monitor and manage the communication connections between the plurality of devices in a network, including the client device.

At block 312, the network device may determine the client device receives a new MAC address according to the username and the service identifier of the client device. If the client device supports MAC randomization, the client device may perform MAC randomization to receive a new MAC address to maintain anonymity. The network device may periodically receive identification information of the client device. When the client device obtains a new MAC address, the network device may receive identification information including the new MAC address. The network device may not be able to properly identify the client device because of the new MAC address of the client device. The network device may obtain the username and the service identifier of the client device that was included in the identification information received from the client device. The network device may use the username and the service identifier to determine that the client device obtained a new MAC address from MAC randomization. The network device may determine the client device obtained a new MAC address by comparing such identification information of the username and the service identifier to the connectivity list, and determine that the username and the service identifier of the client device are identical to the information listed for the client device.

At block 314, the network device may update the unique identifier of the client device according to the new MAC address. Upon identifying that client device, using the username and the service identifier of the client device, and determining that the client device obtained a new MAC address from MAC randomization, the network device may replace the stored MAC address of the client device with the new MAC address. The network device may update the unique identifier of the client device according to the new MAC address. The updated unique identifier of the client device may be used to maintain the properties and most up-to-date identifications of the client device, including the new MAC address. The updated unique identifier of the client device may be used to properly identify the client device by utilizing the client device's properties and various up-to-date identifications.

At block 316, the network device may update the connectivity list of the plurality of devices in the network. The network device may update the connectivity list with the updated unique identifier of the client device, to properly manage and record the identification information of the client device. By updating the connectivity list upon verification of the identification of the client device after performing MAC randomization, existing communication connections between the client device and other devices in the network may be maintained. In this way, the network device may monitor and manage the communication connections between a plurality of devices in the network, including the client device, without having to reauthenticate the client device and reestablish communication connections for the client device.

Using the connectivity list, the network device may send proper identification information of the client device to other devices the client device have a communication connection with. In this way, the other devices may have the most up-to-date identification information, including the updated unique identifier, to identify and verify the client device to establish and maintain communication connections with the client device. The network device may publish the updated unique identifier of the client device to the mDNS server. The network device may publish the updated unique identifier of the client device to one or more services. The mDNS and the one or more services may use the updated unique identifier to properly identify the client device. The one or more services may include AirGroup.

Although examples of the disclosed technology are provided in the MAC context, the examples are not limited to the MAC context and may be used to identify devices supporting anonymity, such as devices implementing a High-Level Data Link Control protocol (HDLC) or Point-to-Point Protocol (PPP), which do not use the MAC address of the respective device. The devices supporting anonymity may further include devices using token ring based access for communication through a Carrier-Sense Multiple Access/Collision Detection (CSMA/CD) protocol. Many variations are possible.

FIG. 4 illustrates an example computing component 400 that includes one or more hardware processors 402 and machine-readable storage media 404 storing a set of machine-readable/machine-executable instructions that, when executed, cause the hardware processor(s) 402 to perform an illustrative method of identifying and verifying a client device supporting MAC randomization. It should be appreciated that there can be additional, fewer, or alternative steps performed in similar or alternative orders, or in parallel, within the scope of the various examples discussed herein unless otherwise stated. The computing component 400 may be, for example, implemented as the server 111 of FIG. 1 and the server 211 of FIG. 2. FIG. 4 summarizes and further elaborates on some aspects previously described.

At instruction 406, the hardware processor(s) 402 may execute machine-readable/machine-executable instructions stored in the machine-readable storage media 404 to retrieve a Media Access Control (MAC) address, a username, and a service identifier of a client device. A network device, such as an access point (AP), may receive a connection with the client device. Upon establishing a connection with the client device, the client device may send identification information to the network device. The network device may obtain a pre-shared key and MAC address of the client device from the identification information. The network device may send the pre-shared key and the MAC address to an authentication server. The authentication server may use the pre-shared key and the MAC address of the client device to validate the client device and generate a username for the client device. The network device may receive the username of the client device upon validation of the client device by the authentication server. The network device may associate the username and the MAC address of the client device together, and store the username and the MAC address of the client device in a database as identification information of the client device.

The network device may obtain a service identifier of the client device. The service identifier may be obtained from an advertisement packet sent to the network device from a Multicast Domain Name System (mDNS). The network device may obtain the service identifier of the client device from the identification information sent from the client device. The network device may store the service identifier in a database with other identification information of the client device, such as the username and the MAC address. The network device may obtain the MAC address, the username and the service identifier from the identification information stored in the database. The network device may obtain the MAC address, the username and the service identifier from the identification information sent from the client device. Many variations are possible.

At instruction 408, the hardware processor(s) 402 may execute machine-readable/machine-executable instructions stored in the machine-readable storage media 404 to generate a unique identifier of the client device based on the username, the MAC address and the service identifier. The network device may use the username, MAC address and service identifier of the client device to generate a unique identifier of the client device. The unique identifier of the client device may be used to maintain the properties and various identifications of the client device. The unique identifier of the client device may be used to properly identify the client device by utilizing the client device's properties and various identifications. The unique identifier of the client device may be used to establish communication connections with other devices in the network (e.g., any of the client devices illustrated in FIG. 1 or FIG. 2).

To generate the unique identifier of the client device, the network device may first verify the username, the MAC address and the service identifier of the client device to determine if the client device has a pre-existing unique identifier stored in the database. In response to determining the client device has a pre-existing unique identifier, based on the username, the MAC address and the service identifier of the client device, the network device may retrieve the unique identifier of the client device from the database. In response to determining the client device does not have a pre-existing unique identifier, based on the username, the MAC address and the service identifier of the client device, the network device may generate the unique identifier of the client device. The unique identifier of the client device may be generated based on the based on the username, the MAC address and the service identifier of the client device.

The network device may publish the unique identifier of the client device to the mDNS server. The network device may publish the unique identifier of the client device to one or more services. The mDNS and the one or more services may use the unique identifier to identify the client device. The one or more services may include AirGroup.

At instruction 410, the hardware processor(s) 402 may execute machine-readable/machine-executable instructions stored in the machine-readable storage media 404 to retrieve a connectivity list of a plurality of devices. The network device may retrieve a connectivity list that includes a list of all communication connections between a plurality of devices in the network, including the client device. The connectivity list may include the identification information, including the unique identifier, of all of the devices in the network, including the client device. Using the connectivity list, the network device may send proper identification information of the client device to other devices the client device have a communication connection with. In this way, the other devices may identify and verify the client device to establish and maintain communication connections with the client device. Using the connectivity list, the network device may monitor and manage the communication connections between the plurality of devices in a network, including the client device.

At instruction 412, the hardware processor(s) 402 may execute machine-readable/machine-executable instructions stored in the machine-readable storage media 404 to determine the client device receives a new MAC address according to the username and the service identifier of the client device. If the client device supports MAC randomization, the client device may perform MAC randomization to receive a new MAC address to maintain anonymity. The network device may periodically receive identification information of the client device. When the client device obtains a new MAC address, the network device may receive identification information including the new MAC address. The network device may not be able to properly identify the client device because of the new MAC address of the client device. The network device may obtain the username and the service identifier of the client device that was included in the identification information received from the client device. The network device may use the username and the service identifier to determine that the client device obtained a new MAC address from MAC randomization. The network device may determine the client device obtained a new MAC address by comparing such identification information of the username and the service identifier to the connectivity list, and determine that the username and the service identifier of the client device are identical to the information listed for the client device.

At instruction 414, the hardware processor(s) 402 may execute machine-readable/machine-executable instructions stored in the machine-readable storage media 404 to update the MAC address of the client device with the new MAC address. Upon identifying that client device, using the username and the service identifier of the client device, and determining that the client device obtained a new MAC address from MAC randomization, the network device may replace the stored MAC address of the client device with the new MAC address.

At instruction 416, the hardware processor(s) 402 may execute machine-readable/machine-executable instructions stored in the machine-readable storage media 404 to update the unique identifier of the client device according to the new MAC address. The network device may update the unique identifier of the client device according to the new MAC address. The updated unique identifier of the client device may be used to maintain the properties and most up-to-date identifications of the client device, including the new MAC address. The updated unique identifier of the client device may be used to properly identify the client device by utilizing the client device's properties and various up-to-date identifications.

The network device may update the connectivity list with the updated unique identifier of the client device, to properly manage and record the identification information of the client device. By updating the connectivity list upon verification of the identification of the client device after performing MAC randomization, existing communication connections between the client device and other devices in the network may be maintained. In this way, the network device may monitor and manage the communication connections between a plurality of devices in the network, including the client device, without having to reauthenticate the client device and reestablish communication connections for the client device.

Using the connectivity list, the network device may send proper identification information of the client device to other devices the client device have a communication connection with. In this way, the other devices may have the most up-to-date identification information, including the updated unique identifier, to identify and verify the client device to establish and maintain communication connections with the client device. The network device may publish the updated unique identifier of the client device to the mDNS server. The network device may publish the updated unique identifier of the client device to one or more services. The mDNS and the one or more services may use the updated unique identifier to properly identify the client device. The one or more services may include AirGroup.

Although examples of the disclosed technology are provided in the MAC context, the examples are not limited to the MAC context and may be used to identify devices supporting anonymity, such as devices implementing a High-Level Data Link Control protocol (HDLC) or Point-to-Point Protocol (PPP), which do not use the MAC address of the respective device. The devices supporting anonymity may further include devices using token ring based access for communication through a Carrier-Sense Multiple Access/Collision Detection (CSMA/CD) protocol. Many variations are possible.

FIG. 5 illustrates a block diagram of an example computer system 500 in which various examples of the present disclosure may be implemented. The computer system 500 may be implemented as the computing system 100 of FIG. 1, the server 211 of FIG. 2, and the computing component 400 of FIG. 4. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an example of a network device, an access point (AP), or similar device. The computer system 500 may use the bus 502 and the hardware processor(s) 504 to perform operations or transfer instructions. For example, processor 504 may transmit a request via bus 502 to access instructions stored in memory 506 or ROM 508 to retrieve a Media Access Control (MAC) address, username and service identifier of a client device, generate a unique identifier, retrieve a connectivity list, determine a client device receives a new MAC address, and update a unique identifier. In another example, processor 504 may transmit a request via bus 502 to access instructions stored in memory 506 or ROM 508 to receive a connection with a client device, obtain a pre-shared key and MAC address of the client device, authenticate the client device, receive a username of the client device, associate the username to the MAC address of the client device, and store the username and MAC address. Various operations may be transmitted via bus 502 without diverting from the essence of the disclosure.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions. The instructions may comprise, for example, retrieve a MAC address, username and service identifier of a client device, generate a unique identifier, retrieve a connectivity list, determine a client device receives a new MAC address, and update a unique identifier.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions. The ROM 508 and storage device 510 may store information, such as, for example, identity information of the client devices, connectivity list, etc. The ROM 508 and storage device 510 may store information and instructions to perform operations. The operations may comprise, for example, retrieve a MAC address, username and service identifier of a client device, generate a unique identifier, retrieve a connectivity list, determine a client device receives a new MAC address, and update a unique identifier.

Computer system 500 can further include at least one network interface 512, such as a network interface controller module (NIC), network adapter, or the like, or a combination thereof, coupled to the bus 502 for connecting the computer system 500 to at least one network. The network interface 512 can provide a two-way data communication coupling to one or more network links that are connected to one or more local networks. For example, network interface 512 may be an integrated services digital network (ISDN) card, cable modem, satellite modem, or a modem to provide a data communication connection to a corresponding type of telephone line. As another example, network interface 512 may be a local area network (LAN) card to provide a data communication connection to a compatible LAN (or WAN component to communicated with a WAN). Wireless links may also be implemented. In any such implementation, network interface 512 may send and receive electrical, electromagnetic or optical signals that carry digital data streams representing various types of information.

A network link typically can provide data communication through one or more networks to other data devices. For example, a network link may provide a connection through local network to a host computer or to data equipment operated by an Internet Service Provider (ISP). The ISP in turn can provide data communication services through the worldwide packet data communication network now commonly referred to as the "Internet." Local network and Internet both use electrical, electromagnetic or optical signals that can carry digital data streams. The signals through the various networks and the signals on network link and through network interface 512, which can carry the digital data to and from computer system 500, are example forms of transmission media.

The computer system 500 can send messages and receive data, including program code, through the network(s), network link and network interface 512. In the Internet example, a server might transmit a requested code for an application program through the Internet, the ISP, the local network and the network interface 512. The received code may be executed by processor 504 as it is received, and/or stored in storage device 510, or other non-volatile storage for later execution. The network interface 512 may be used to receive and transmit identity information of one or more client devices to identify and verify client devices supporting MAC randomization. Various communications are illustrated throughout the disclosure.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAS, firmware and/or program logic which in combination with the computer system 500 that causes or programs the computer system 500 to be a special-purpose machine. According to one or more examples, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 502. The transmission media can also take a form of acoustic or light waves, such as those generated during radio-wave and infra-red data communications.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method performed by an access point (AP), the method comprising:

retrieving a MAC address, a username, and a service identifier of a device, wherein the service identifier is obtained from an advertisement packet sent from a Multicast Domain Name System (mDNS) server;

generating a unique identifier of the device based on the username, the MAC address and the service identifier;

retrieving a connectivity list of a plurality of devices comprising the unique identifier of the device;

determining the device receives a new MAC address according to the username and the service identifier of the device;

updating the MAC address of the device with the new MAC address of the device; and updating the unique identifier of the device according to the new MAC address.

2. The computer-implemented method of claim 1, further comprising:

receiving a connection with the device;

obtaining a pre-shared key and the MAC address of the device;

sending the pre-shared key and the MAC address of the device to an authentication server;

receiving the username of the device upon validation of the pre-shared key;

associating the username to the MAC address of the device; and storing the username and the MAC address of the device.

3. The computer-implemented method of claim 1, further comprising:

updating the connectivity list of the plurality of devices with the updated unique identifier of the device.

4. The computer-implemented method of claim 1, further comprising:

publishing the unique identifier of the device to a mDNS server and a service on the AP to use the unique identifier to identify the device; and publishing the updated unique identifier to the mDNS server and the service to replace the unique identifier.

5. The computer-implemented method of claim 4, wherein the service comprises AirGroup.

6. The computer-implemented method of claim 1, wherein the device receives the new MAC address by performing MAC randomization to maintain anonymity.

7. The computer-implemented method of claim 1, wherein the generating the unique identifier of the device comprises:

verifying the device based on the username, the MAC address and the service identifier to determine if the unique identifier of the device is pre-existing and stored in a database;

in response to determining the unique identifier is pre-existing, retrieving the unique identifier from the database; and in response to determining the unique identifier is not pre-existing, generating the unique identifier of the device based on the username, the MAC address and the service identifier.

8. A computing system comprising:

one or more processors; and a memory storing instructions that, when executed by the one or more processors, cause the one or more processors to perform operations comprising:

receiving an advertisement packet from a Multicast Domain Name System (mDNS) server;

obtaining a service identifier of a device from the advertisement packet;

retrieving a MAC address and username of the device;

generating a unique identifier of the device based on the username, the MAC address and the service identifier;

retrieving a connectivity list of a plurality of devices comprising the unique identifier of the device;

determining the device receives a new MAC address according to the username and the service identifier of the device;

updating the MAC address of the device with the new MAC address of the device; and updating the unique identifier of the device according to the new MAC address.

9. The computing system of claim 8, wherein the instructions further cause the one or more processors to perform operations comprising:

receiving a connection with the device;

obtaining a pre-shared key and the MAC address of the device;

sending the pre-shared key and the MAC address of the device to an authentication server;

receiving the username of the device upon validation of the pre-shared key;

associating the username to the MAC address of the device; and storing the username and the MAC address of the device.

10. The computing system of claim 8, wherein the instructions further cause the one or more processors to perform operations comprising:

publishing the unique identifier of the device to the mDNS server and a service on the AP to use the unique identifier to identify the device; and publishing the updated unique identifier to the mDNS server and the service to replace the unique identifier, wherein the service comprises AirGroup.

11. The computing system of claim 8, wherein the device receives the new MAC address by performing MAC randomization to maintain anonymity.

12. The computing system of claim 8, further comprising:

updating the connectivity list of the plurality of devices with the updated unique identifier of the device.

13. The computing system of claim 8, wherein the generating the unique identifier of the device comprises:

verifying the device based on the username, the MAC address and the service identifier to determine if the unique identifier of the device is pre-existing and stored in a database;

in response to determining the unique identifier is pre-existing, retrieving the unique identifier from the database; and in response to determining the unique identifier is not pre-existing, generating the unique identifier of the device based on the username, the MAC address and the service identifier.

14. A non-transitory storage medium storing instructions that, when executed by at least one processor, cause the at least one processor to perform operations comprising:

retrieving a MAC address, a username, and a service identifier of a device, wherein the service identifier is obtained from an advertisement packet sent from a Multicast Domain Name System (mDNS) server;

generating a unique identifier of the device based on the username, the MAC address and a service identifier;

retrieving a connectivity list of a plurality of devices comprising the unique identifier of the device;

determining the device receives a new MAC address according to the username and the service identifier of the device;

updating the MAC address of the device with the new MAC address of the device;

updating the unique identifier of the device according to the new MAC address; and updating the connectivity list of the plurality of devices with the updated unique identifier of the device.

15. The non-transitory storage medium of claim 14, wherein the instructions further cause the at least one processor to perform operations comprising:

receiving a connection with the device;

obtaining a pre-shared key and the MAC address of the device;

sending the pre-shared key and the MAC address of the device to an authentication server;

receiving the username of the device upon validation of the pre-shared key;

associating the username to the MAC address of the device; and storing the username and the MAC address of the device.

16. The non-transitory storage medium of claim 14, wherein the instructions further cause the at least one processor to perform operations comprising:

publishing the unique identifier of the device to the mDNS server and a service on the AP to use the unique identifier to identify the device; and publishing the updated unique identifier to the mDNS server and the service to replace the unique identifier, wherein the service comprises AirGroup.

17. The non-transitory storage medium of claim 14, wherein the generating the unique identifier of the device comprises:

verifying the device based on the username, the MAC address and the service identifier to determine if the unique identifier of the device is pre-existing and stored in a database;

in response to determining the unique identifier is pre-existing, retrieving the unique identifier from the database; and in response to determining the unique identifier is not pre-existing, generating the unique identifier of the device based on the username, the MAC address and the service identifier.

18. The non-transitory storage medium of claim 14, wherein the device receives the new MAC address by performing MAC randomization to maintain anonymity.

* * * * *